April 23, 1957 — L. V. RUSH — 2,789,558
MEDULLARY PIN DRIVER AND EXTRACTOR
Filed Sept. 17, 1953
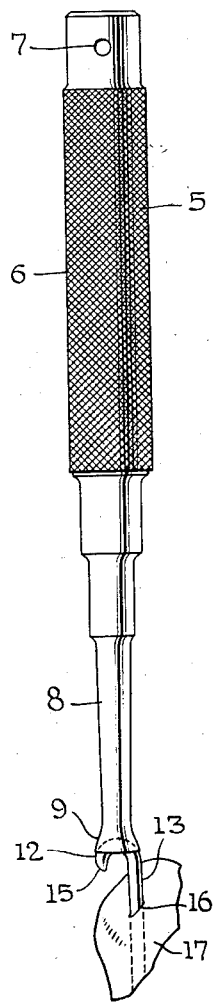
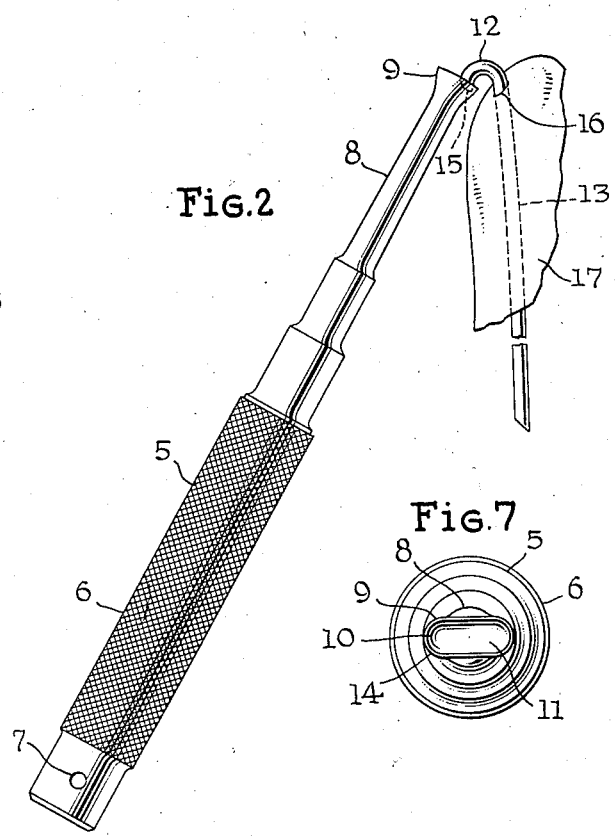
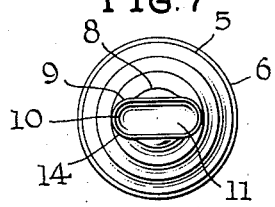
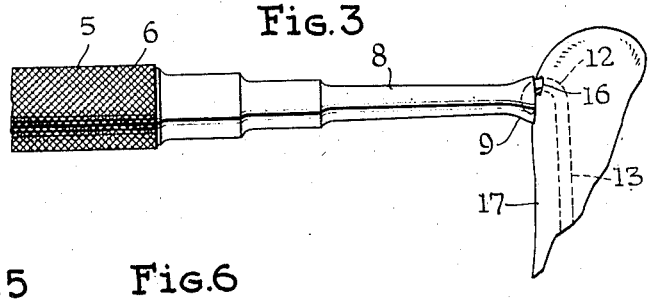
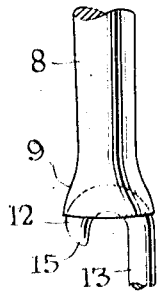
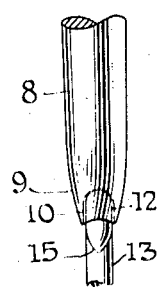
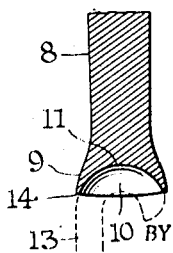
INVENTOR
Leslie V. Rush
ATTORNEYS

United States Patent Office 2,789,558
Patented Apr. 23, 1957

2,789,558

MEDULLARY PIN DRIVER AND EXTRACTOR

Leslie V. Rush, Meridian, Miss.

Application September 17, 1953, Serial No. 380,654

1 Claim. (Cl. 128—83)

The invention relates generally to surgical instruments and primarily seeks to provide a novel hand operated instrument which can be employed with great efficiency, and to great advantage, in the driving and extracting of medullary pins.

In U. S. Letters Patent 2,579,968 issued to me on December 25, 1951, there is disclosed a medullary pin which has brought about a major advance in the fixation of bone fractures. These pins have rebent hook shaped head end portions and pointed and flat sided entry end portions and are adapted to be driven into the medullary canal and across the fracture line in long bones, the hook end serving as a driving head and a means for guiding the driving process, and also as a means for preventing migration of the pin after it has been driven and set, all as outlined in said patent. Because of the smoothly rounded shaping of the hook and the engagement of the rebent end extremity point thereof in the bone structure, use of the pin is attended by an absolute minimum of irritation of the soft tissue and the underlying bone structure, the pin introduction can be effected through a very small stab incision, and bone capping is substantially eliminated. It is the purpose of the present invention to provide a novel hand instrument for facilitating the driving and extraction of medullary pins of this type.

In its more detailed nature the invention resides in providing a surgeon's tool adaptable for driving hook headed medullary pins and comprising an elongated body for receiving mallet blows at its proximal end and having at its distal end a cup shaped portion conforming generally in cavity shaping to the hook end of a pin to be driven thereby so as to securely engage over and partially embrace said hook end and permit driving of the pin with the axis of the tool in line with the axis of the pin or in angular relation thereto.

A further object of the invention is to provide a surgeon's tool of the character stated wherein the edges of the cup portion are sharp so that they can be utilized to remove the bony process at the entrance aperture through which the pin was driven to bring about a desired partial countersinking of the hook end of the pin, or to permit engagement of the cup end of the tool under the hook end point terminus and reverse driving of the tool with said hook point engaged in the cavity for extracting the pin from the bone.

In the driving of medullary pins of the kind referred to, a surgeon frequently has occasion to preshape the pins prior to the driving thereof, thereby to assure contact of the pin in the medullary canal at points assuring that pressure will be applied to engaging fracture faces by reason of the inherent resiliency of the pin and in such direction as to maintain intimate contact greatly facilitating knitting of said faces. A still further object of the invention is to provide a surgeon's tool of the character stated wherein is included a medullary pin receiving cross aperture in which pins can be inserted so that the tool can be used as a lever in bending the pins to the desired shape.

With the above and other objects in view that will hereinafter appear, the nature of the invention will be more clearly understood by reference to the following detailed description, the appended claim and the several views illustrated in the accompanying drawing.

In the drawing:

Figure 1 is a side elevation illustrating the tool in the process of driving a medullary pin into a bone.

Figure 2 is a view similar to Figure 1 showing a use of the tool in the extraction of a medullary pin.

Figure 3 is a view similar to Figure 2 showing how the tool can be presented to cut away bony process at the aperture through which a pin has been driven into the bone, either to facilitate a countersinking of the hook end of the pin in the setting thereof, or to facilitate engagement of the tool cup end under the hook extremity and an extraction of the pin.

Figure 4 is an enlarged fragmentary side elevation of the cup end portion of the tool, the same being shown in engagement with the head end portion of a medullary pin.

Figure 5 is an edge view of the part fragments shown in Figure 4.

Figure 6 is an enlarged fragmentary sectional view of the cup end of the tool.

Figure 7 is a bottom end view of the tool, looking into the pin head engaging cup portion thereof.

In the practical development of the invention, the tool is formed to include a cylindrical handle portion 5 which is preferably knurled or roughened at 6 to facilitate certain handling of the tool. The handle also is provided with a cross bore 7 near the upper or proximal end thereof for a purpose to be described hereinafter.

Beneath the handle portion 5, 6 the tool includes a reduced shank portion 8 terminating at its distal end in a cup portion generally designated 9. The cup end portion has a cavity 10 which is generally oval in shape, the bottom wall 11 thereof being designed to conform generally to the hook head 12 of a medullary pin 13 adapted to be driven and extracted by the tool. Such pins are of the well known and commercially used form disclosed in the previously mentioned Patent 2,579,968 issued to me on December 25, 1951. The mouth of the tool end cavity 10 is defined by sharp edges 14 and the depth of the cavity 10 is dimensioned so that the sharp edged terminus of the tool cavity lies well above the point extremity 15 of the hook head end of the medullary pin 13 when the tool end is engaged with the pin in the manner clearly illustrated in Figures 4 and 5 of the drawings.

The patent referred to hereinabove fully describes the manner of use of the medullary pins, and it is believed to be unnecessary herein to dwell upon the manner of use and the advantages of such pins. In Figure 1 of the drawing, a pin is illustrated in the process of being driven into a previously formed receiving aperture 16 in a long bone 17. It will be noted that the distal or cupped end of the tool is applied over the hook body end of the pin in the manner illustrated in Figures 4 and 5, and because of the illustrated shaping of the cup end of the tool, the same can be applied to the pin in general alignment with the axis thereof as shown in Figure 1, or it can be applied with its axis in angular relation to the axis of the medullary pin during the driving of the latter if the location of the pin with reference to the fractured bone requires such angular contact. In either instance, the cupped end of the tool will serve to retain the desired contact with the pin head as the blunt mallet in the hands of the skilled surgeon is applied to the proximal end of the tool.

In many instances of use the surgeon is called upon to preshape the medullary pin so that it will properly follow the medullary canal into which it is to be driven in the accomplishment of its fracture fixing purpose, and this preshaping of the pin also is resorted to by skilled surgeons seeking to take advantage of the inherent resiliency in the pin and planned contact thereof within the bone effective to hold the fracture faces in intimate contact so as to facilitate knitting of the fracture. The provision of the cross bore 7 in the proximal end of the tool will be found of great advantage in this preshaping of the pin, because it is only necessary to insert the pin in the cross bore, and to utilize the tool as a lever in effecting the desired reshaping of the pin.

The novel medullary pin disclosed in my patent makes it possible to make only a very small stab wound in preparation for the initial boring of the bone and the driving of the pin. In completing the driving of the pin shown in progress in Figure 1, the head end is firmly engaged against the bone with the hook point extremity 15 embedded in the bone so as to assure against migration of the pin along or about its axis. This smooth head shaping of the pin permits the placement of the pin head in the manner stated with an absolute minimum of irritation of the soft tissue and the underlying bone structure at the point of entry of the pin.

When it is desired to extract the pin the tool can be applied transversely with relation to the pin head somewhat as illustrated in Figure 3, and by utilizing the sharp edges 14 defining the mouth of the tool end cavity the bone process can be chiseled away to provide clearance for the tool end so that it can be swung around to the position illustrated in Figure 2 with the hook head end extremity 15 received in the tool end cavity 10, and by driving upwardly on the tool in the manner indicated in Figure 2 the pin can be extracted with great facility.

It is to be understood that the tool disclosed herein will be made in several sizes corresponding to a range of size variation in the medullary pins themselves, thereby to provide tools which will always cooperate with the pins to be driven and extracted thereby in the efficient manner illustrated in Figures 4, 5 and 6.

Provision of the novel cup shaped end on the tool not only greatly facilitates and assures accuracy in the later stage driving of medullary pins, and also secure engagement of the tool with the pin during the driving, whether it be in co-axial alignment with the pin, or with the tool axis and pin axis in angular relation, but it also provides certainty and security in the extraction of the pin. Before the provision of the herein disclosed tool, it was necessary to use a chisel to remove bone portions and start the process of extracting the pin, and this practice provided many disadvantages because of the tendency of the chisel to slip off during the chiseling of the bone and also during attempts to use the chisel in starting the extraction of the pin. It will be obvious that this practice was conducive to a damaging of bone and tissue, and also to damaging of the pin and the chisel.

While an example form of the tool structure is disclosed herein it is to be understood that variations in the specific form of the tool may be made without departing from the spirit and scope of the invention as defined in the appended claim.

I claim:

A surgeon's medullary pin driving and extracting tool comprising, an elongated body for receiving mallet blows at its proximal end and having at its distal end a cup shaped portion conforming generally in cavity shaping to the hook end of a pin to be driven thereby so as to securely engage over and partially embrace said hook end and permit driving of the pin with the axis of the tool body approximately in line with the axis of the pin or in angular relation thereto, the edges defining the outlet extremity of the cavity being sharp and somewhat oval in line to conform generally and merge smoothly into the shape of a hooked end of a medullary pin and yet be rockable thereover transversely and longitudinally of said hook.

References Cited in the file of this patent

UNITED STATES PATENTS

| | | |
|---|---|---|
| 337,212 | Van Dusen | Mar. 2, 1886 |
| 985,087 | Wilson | Feb. 21, 1911 |
| 1,914,257 | Holmes | June 13, 1933 |
| 2,638,092 | Dorr | Sept. 15, 1950 |